UNITED STATES PATENT OFFICE.

SEYMOUR H. DICKINSON AND JAMES ALLIE, OF MIDDLEBURY, INDIANA.

PAINTING COMPOSITION.

SPECIFICATION forming part of Letters Patent No. 304,414, dated September 2, 1884.

Application filed February 13, 1884. (No specimens.)

*To all whom it may concern:*

Be it known that we, SEYMOUR H. DICKINSON and JAMES ALLIE, citizens of the United States, residing at Middlebury, in the county of Elkhart and State of Indiana, have invented a new and useful Painting Composition, of which the following is a specification.

Our invention relates to a new and useful improvement in painting compositions, and it has for its object to produce a paint which shall thoroughly and effectively protect the roof and sides of a building to which it is designed to be applied; and it consists in the combination of the various ingredients, hereinafter fully described, and pointed out in the claim.

Our improved paint is composed of the following ingredients, in about the proportions specified: coal-tar, twenty gallons; asphaltum-varnish, four gallons; asbestus, five pounds; sulphur, four pounds; litharge, two pounds; Akron cement, two pounds; powdered pumice-stone, three pounds; mineral, three pounds.

In preparing the above composition the coal-tar and asphaltum are boiled together for about one hour. The asbestus, sulphur, litharge, and Akron cement, which have been previously reduced to a fine or powdered form, are then mixed with the coal-tar and asphaltum, and the composition is allowed to boil for about thirty minutes longer. The powdered pumice-stone is then added, and the whole mixture allowed to boil for about fifteen minutes, when the same is ready for use. Benzine may be added in a sufficient quantity to thin the mixture, if the same be found too thick.

In using the above composition upon a wooden roof or other object constructed of wood, it is preferably applied in a warm state, while in use upon metal it is preferably applied cold.

The composition above described affords a ready and efficient roofing-paint, and thoroughly protects the latter from the action of fire or weather.

We claim and desire to secure by Letters Patent—

The herein-described painting or protecting composition, composed of coal-tar, asphaltum-varnish, asbestus, sulphur, litharge, Akron cement, powdered pumice-stone, and mineral, in about the proportions specified.

In testimony that we claim the foregoing as our own we have hereto affixed our signatures in presence of two witnesses.

SEYMOUR H. DICKINSON.
JAMES ALLIE.

Witnesses:
JACOB C. HERSHBERGER,
ALVA WHITCOMB.